W. F. WALSH.
ANTISLIPPING ATTACHMENT FOR HORSESHOES.
APPLICATION FILED MAR. 2, 1912.
1,032,716.
Patented July 16, 1912.
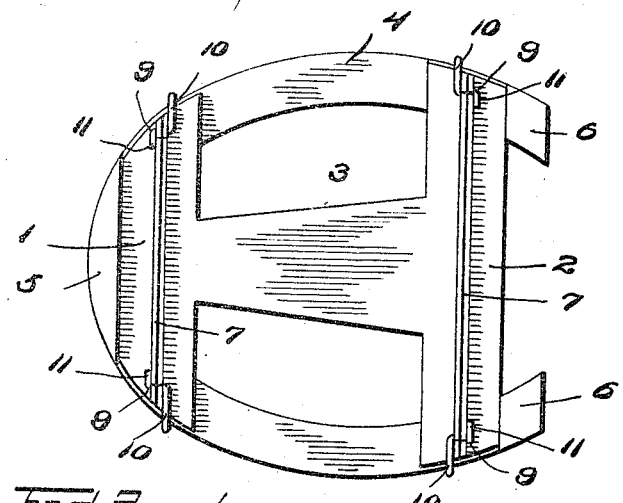
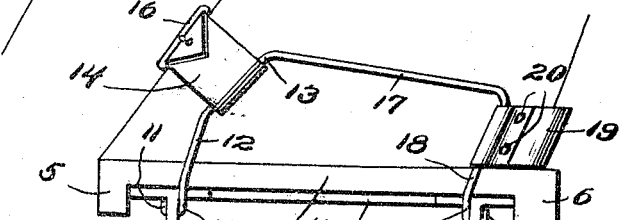
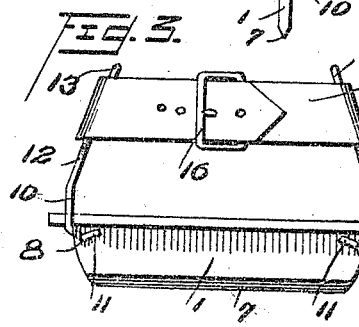
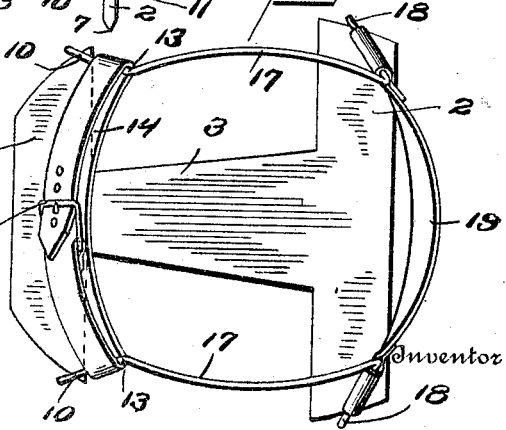
Witnesses
Inventor
William F. Walsh
By Joshua R. H. Potts
Attorney

UNITED STATES PATENT OFFICE.

WILLIAM F. WALSH, OF GLENOLDEN, PENNSYLVANIA.

ANTISLIPPING ATTACHMENT FOR HORSESHOES.

1,032,716.  Specification of Letters Patent.  Patented July 16, 1912.

Application filed March 2, 1912. Serial No. 681,108.

*To all whom it may concern:*

Be it known that I, WILLIAM F. WALSH, a citizen of the United States, residing at Glenolden, in the county of Delaware and State of Pennsylvania, have invented certain new and useful Improvements in Antislipping Attachments for Horseshoes, of which the following is a specification.

My invention relates to improvements in antislipping attachments for horse shoes, the object of the invention being to provide a device which may be readily secured in position against the lower face of the horse shoe, and clamped around the hoof so as to effectually secure the device in position, and when in position will prevent slipping upon the ice or other slippery pavements.

A further object is to provide a device of this character which is of extremely simple construction, comparatively cheap to manufacture, yet strong and durable in use.

With these and other objects in view, the invention consists in certain novel features of construction and combinations and arrangements of parts as will be more fully hereinafter described and pointed out in the claim.

In the accompanying drawings: Figure 1, is a bottom plan view illustrating my improvements. Fig. 2, is a view in side elevation. Fig. 3, is a view in front elevation of the device removed, and Fig. 4, is a plan view of the device removed.

My improved device comprises transversely positioned parallel T-shaped bars 1 and 2 which are connected by an integral bar 3, so that the upper face of the device is smooth and adapted to receive the shoe 4 thereon, the toe calk 5 of the shoe extending over the front edge of the front bar 1, and the heel calks 6 of the shoe extending over the rear face of bar 2. The vertical webs of these T-bars 1 and 2 are sharpened at their lower edges as shown at 7 so as to grip the slippery pavement and prevent slipping, and said vertical webs are rounded at their ends, and near their ends, are provided with openings 8 to receive the hooked ends 9 of side frame 10. These side frames are of the peculiar shape shown in Fig. 3 to conform in shape to the shape of the hoof. In other words, each side frame, which preferably consists of a heavy wire at both ends, is bent to form the hooks 9, and these hooks at their free ends project inwardly as shown at 11 so as to prevent any possibility of injuring the horse by reason of interference, and also prevent the frames from being accidentally drawn out of the bars.

The front end of each frame inclines inwardly and rearwardly as shown at 12. It is then bent at an obtuse angle and extends rearwardly as shown at 13 a distance substantially equal to the width of a front strap 14 which is adapted to be positioned across the front of the hoof and securely clamped by means of a buckle 16. The wires are then again bent at an obtuse angle and extend rearwardly and slightly downwardly as shown at 17, and at their rear are bent at an acute angle and extend downwardly and forwardly as shown at 18 to the rear hook 9. These rear portions 18 are of the same width as a band 19, which at its ends is looped around the frames and the ends riveted to the body portion as shown at 20. It will thus be seen that to insert the device upon the hoof, it is simply necessary to remove the strap 14. The device may then be assembled onto the shoe and the hoof, and when strap 14 is positioned as indicated and drawn tight and secured by means of its buckle, the device will be securely held upon the hoof. It will therefore be understood that the side frames both have an upward and a rearward tendency, and that the portions 13 and 18 are of just the length to conform to the width of the straps 14 and 19 respectively. This prevents any movement of the straps on the frame, and when clamped on the hoof, the device will be securely held.

Various slight changes might be made in the general form and arrangement of parts described without departing from my invention, and hence I do not limit myself to the precise details set forth, but consider myself at liberty to make such changes and alterations as fairly fall within the spirit and scope of the appended claim.

Having thus described my invention, what I claim as new and desire to secure by Letters Patent is:

An anti-slipping attachment for horse shoes, consisting of a shoe support comprising transverse front and rear bars having integral vertical webs, said webs having sharp lower edges and rounded ends, a bar connecting said transverse bars and integral with both, said webs having openings therein near their ends, wire frames having hooked ends normally positioned in said openings, and straps connecting said frames and clamping the device on a hoof, substantially as described.

In testimony whereof I have signed my name to this specification in the presence of two subscribing witnesses.

WILLIAM F. WALSH.

Witnesses:
　DANIEL McGUGAN,
　C. W. CHANDLER.

Copies of this patent may be obtained for five cents each, by addressing the "Commissioner of Patents, Washington, D. C."